United States Patent [19]

Schaffner et al.

[11] Patent Number: 5,488,503
[45] Date of Patent: Jan. 30, 1996

[54] LOW-POWER, STABILIZED, PHOTONIC MODULATOR SYSTEM

[75] Inventors: James H. Schaffner, Chatsworth; Mark B. Hammond, Irvine, both of Calif.

[73] Assignee: Hughes Aircraft Company, Los Angeles, Calif.

[21] Appl. No.: 386,050

[22] Filed: Feb. 9, 1995

[51] Int. Cl.⁶ ................................................. G02F 1/225
[52] U.S. Cl. ............................................ 359/245; 359/187
[58] Field of Search .................................. 359/181, 187, 359/245, 276

[56] References Cited

U.S. PATENT DOCUMENTS

| | | | |
|---|---|---|---|
| 4,460,249 | 7/1984 | Vincent | 350/356 |
| 4,716,384 | 12/1987 | Roe et al. | 332/7.51 |
| 5,003,624 | 3/1991 | Terbrack et al. | 455/618 |
| 5,218,468 | 6/1993 | Shaw | 359/245 |
| 5,317,581 | 5/1994 | Onishi et al. | 359/180 |
| 5,321,543 | 6/1994 | Huber | 359/187 |

OTHER PUBLICATIONS

C. H. Bulmer, et al., "Phase Tuning by Laser Ablation", *IEEE Photonics Technology, Letters*, vol. 3, No. 6, Jun. 1991, pp. 510–512.

M. G. Lee, et al., "New Robust Bias Control Method for Optical Modulators", *SPIE Symposium Digest on Optical and Digital GaAs Technologies*, vol. 1291, pp. 55–65.

Q. Jiang, et al., "Coherent FSK System Using a Mach–Zehnder Modulator", *IEEE Photonics Technology, Letters*, vol. 5, No. 8, Aug., 1993, pp. 941–943.

J. Schaffner, et al., "High Fidelity Microwave Remoting", *Final Technical Report*, Rome–Laboratory, Air Force Material Command, Griffiss Air Force Base, New York, #RL–TR–93–3, Mar., 1993 pp. 24–32.

P. Horowitz et al., "The Art of Electronics", 2nd Edition, Cambridge University Press, Cambridge, 1989, pp. 956–957.

*Primary Examiner*—Mark Hellner
*Attorney, Agent, or Firm*—Vijayalakshmi D. Duraiswamy; Wanda K. Denson-Low

[57] ABSTRACT

A simple, low-power feedback control loop is arranged to set the operating point of a photonic intensity modulator. The loop includes photodetectors which are respectively illuminated with a sample of the carrier signal into the modulator and the modulated signal out of the modulator. A comparison network develops an error signal which is integrated and applied to the voltage modulating port of the modulator. The comparison network includes voltage dividers for adjusting the transfer function operating point of the modulator. The control loop is especially suited for stabilizing Mach-Zehnder and directional coupler modulators.

19 Claims, 4 Drawing Sheets

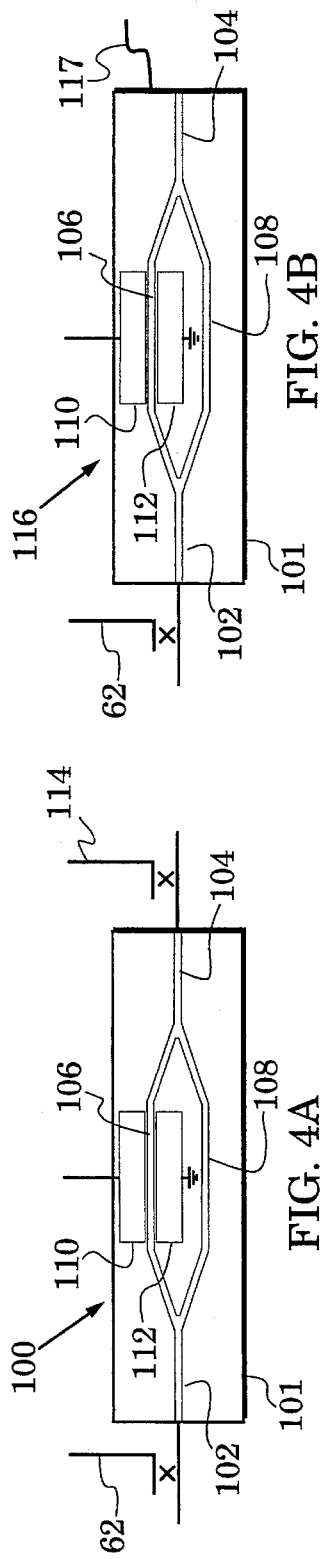
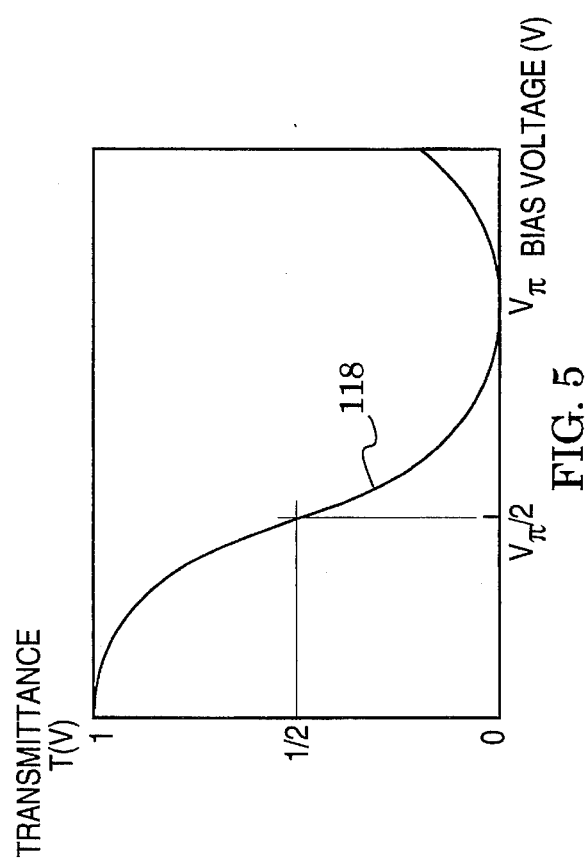

LOW-POWER, STABILIZED, PHOTONIC MODULATOR SYSTEM

BACKGROUND OF THE INVENTION

1. Field of the Invention

The present invention relates generally to photonic modulators.

2. Description of the Related Art

Photonics involves the control of photons; it is concerned with the properties and applications of photons, especially as a medium for transmitting information. Integrated optics is the technology of integrating various optical components onto a substrate, typically with the components connected by optical waveguides. An important integrated-optic photonic component is the intensity modulator in which an applied electrical signal amplitude modulates a light carrier. The intensity modulator is often employed in photonic communication links. It is particularly suited for use in analog signal transmission applications, e.g., cable television and remote antenna installations.

The Mach-Zehnder interferometer modulator and the directional-coupler modulator are well known intensity modulators (e.g., see Bahaa Saleh and Malvin Teich, *Fundamentals of Photonics*, New York, John Wiley & Sons, Inc., 1991, pp. 700–709). Both modulators are based on the electro-optic effect which is the change of a material's refractive index resulting from the application of an electric field. In some materials, the refractive index changes in proportion to the applied electric field (the Pockels effect). In others, the refractive index changes in proportion to the square of the applied electric field (the Kerr effect). The Mach-Zehnder interferometer and the directional-coupler modulator are typically fabricated with materials, e.g., lithium niobate, that exhibit the Pockels effect.

In a Mach-Zehnder modulator fabricated of lithium niobate, an electric signal is placed across a first strip of lithium niobate to cause a corresponding change in the strip's refractive index. This changes the effective optical path length, and a light signal passed through this strip emerges with the light phase modulated by the electric signal. The input and output of this first strip are joined with the input and output of a parallel second unmodulated strip. As a consequence, light at the combined output is amplitude modulated by interference between a phase-modulated signal and an unmodulated signal. In construction, the strips are typically indiffused with titanium, which raises their refractive index above that of a surrounding substrate. The difference in refractive index guides the light through the strips by total internal reflection, i.e., the strips are optical waveguides.

In the directional coupler modulator, the electro-optic effect is used to control the coupling between two parallel optical waveguides. When light travels down an optical waveguide, there is some short-range lateral penetration of the light wave beyond the waveguide boundary. This lateral wave normally decays, and is thus called the "evanescent wave". Although the evanescant wave amplitude decreases rapidly beyond the boundary, a second waveguide introduced into this region will couple into the evanescent wave and provide a path for carrying away energy that otherwise would have returned to the first waveguide. The coupled waveguides thus form a directional coupler.

If the waveguides are identical and in close proximity for a sufficient coupling length, all of the energy will transfer to the second waveguide. Two parameters govern the strength of this coupling process: the coupling coefficient c (which depends on the dimensions, operating wavelength and refractive indices) and the mismatch in propagation constants. The latter parameter is controlled by the difference in refractive indices. Applying an electric signal across the waveguides, in the coupling region, increases the refractive index in one and decreases the refractive index in the other. The exchange of energy between the two waveguides can be controlled across a range bounded by the point where all energy is transferred and the point where no energy is transferred.

The light-transmittance transfer function of the Mach-Zehnder modulator has an inflection point defined as a point of maximum slope and zero curvature. If the modulator is operated at this inflection point, its best linearity and sensitivity are obtained, its production of second harmonics is reduced to zero, and its third-order intermodulation products are minimized. For the directional coupler modulator, the choice of an operating point is not as simple. There is a first operating point for best linearity and sensitivity, another for the least production of second harmonics, and a third for best third-order intermodulation performance.

Typically, a bias voltage is applied to place an intensity modulator at a selected operating point. Because of device instabilities, e.g., caused by temperature and mechanical stress, the voltage required to establish this operating point changes over time (primarily due to changed effective path lengths in the Mach-Zehnder modulator and changed coupling coefficient in the directional coupler modulator). To counter this drift, the bias voltage must be constantly adjusted. In experimental setups this may be done manually. For stand-alone RF links that operate continuously, an automatic bias control is needed.

A prior art bias control method injects an electrical pilot tone into the modulator and detects the second harmonic of this signal at the modulator output (M. G. Lee, et al., "New Robust Bias Control Method for Optical Modulators", *SPIE Symposium Digest on Optical and Digital GaAs Technologies*, Vol. 1291, pp. 55–65). The bias voltage is then adjusted until the second harmonic of this pilot tone is minimized. This method is effective in bringing the modulator to an inflection point on the transmittance transfer function.

However, the circuitry is complicated: a pilot tone must be generated, its second harmonic measured, and an error signal developed from this measurement. If it is desired to reduce third-order intermodulation for a directional coupler modulator, then the control circuit would have to be modified to maintain a different operation point, e.g., by minimizing the pilot tone third harmonic. Finally, this bias control method involves a number of circuits with the consequent use of considerable power. In many modulator applications, e.g., remote antennas, a permanent power source is not available and power consumption is, therefore, a major concern.

SUMMARY OF THE INVENTION

The present invention is directed to a photonic modulator system in which the modulator is stabilized by a simple bias control loop that can operate from a low-current power source, e.g., a battery. Therefore, embodiments of the invention find particular utility in transmission networks where a permanent power source is not typically available.

Modulator systems in accordance with the invention control the transfer function operating point of photonic intensity modulators that are configured to deliver an intensity modulated light signal at an output port in response to a carrier light signal at a first input port and a modulating voltage signal at a second input port. These modulators include directional coupler modulators and Mach-Zehnder modulators.

The systems incorporate a control loop that is characterized by a reference photodetector arranged to produce a reference signal in response to the intensity of the carrier signal; a feedback photodetector arranged to produce a feedback signal in response to the intensity of the modulated signal; a comparison network configured to convert the difference between all or a portion of the initial reference signal and all or a portion of the initial feedback signal into an error signal; and a loop processor arranged to deliver a bias voltage at the second input port in response to the error signal.

The comparison network may include resistive dividers configured to select portions of the reference signal and the feedback signal to obtain a selected intensity ratio of the modulated signal to the carrier signal, i.e., a selected operating point on the modulator's transfer function. A different modulator operating point can be selected by a change of resistor values.

The novel features of the invention are set forth with particularity in the appended claims. The invention will be best understood from the following description when read in conjunction with the accompanying drawings.

BRIEF DESCRIPTION OF THE DRAWINGS

FIG. 4A is a plan view that illustrates a Mach-Zehnder modulator circuit for substitution into the system of FIG. 1;

FIG. 4B is a plan view that illustrates another Mach-Zehnder modulator circuit for substitution into the system of FIG. 1;

FIG. 5 is a graph of the transfer function of the Mach-Zehnder modulators of FIGS. 4A–4B.

DESCRIPTION OF THE PREFERRED EMBODIMENTS

Figure 1:
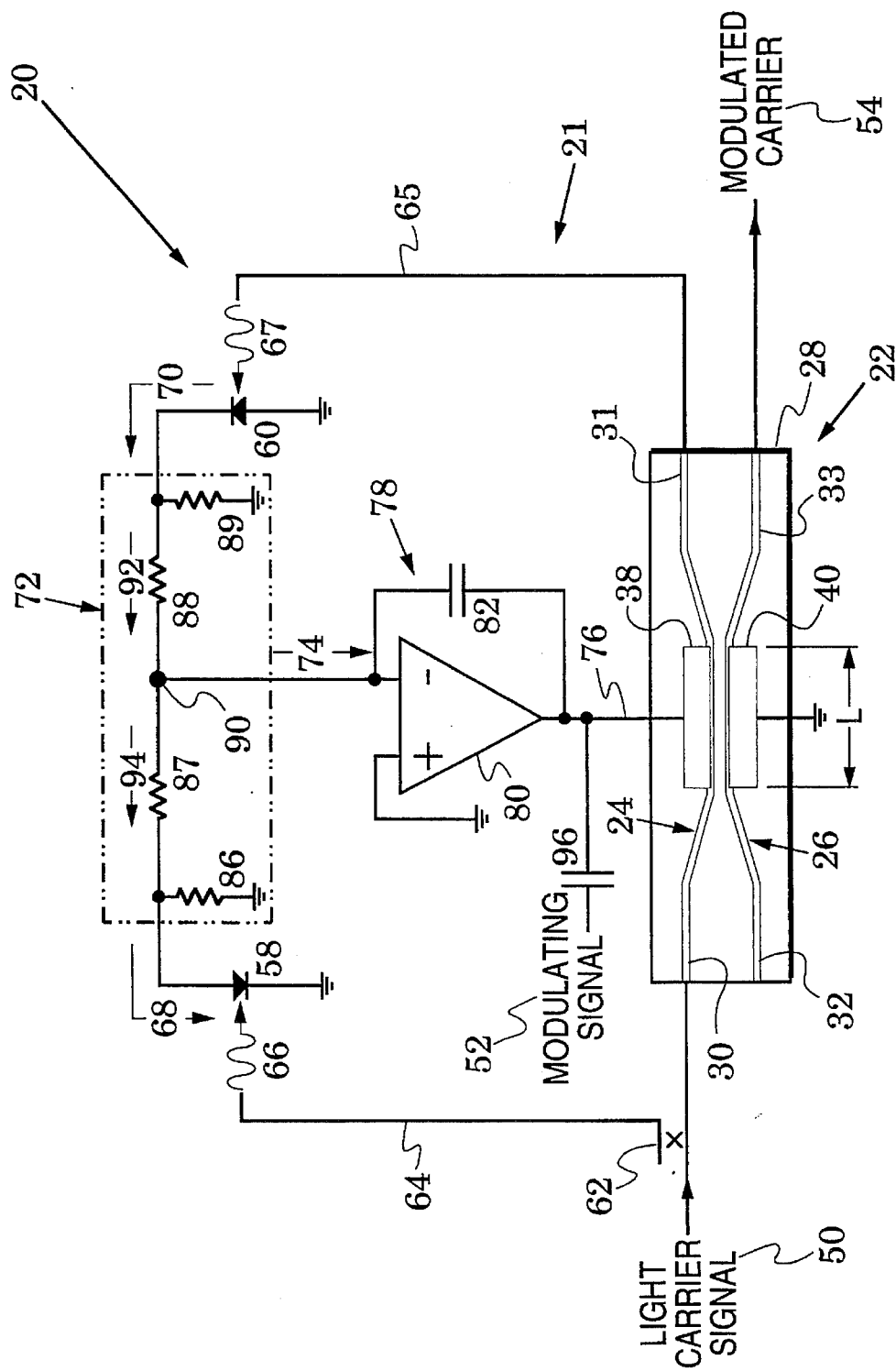
FIG. 1 is a schematic diagram that illustrates a bias stabilized, directional coupler modulator system in accordance with the present invention.

FIG. 1 illustrates a low-power, bias stabilized, integrated-optic modulator system 20 in accordance with the present invention. The system 20 includes a control loop 21 that develops and applies an error signal to a directional coupler modulator 22 to maintain a selected operating point on the modulator's transfer function. Various operating points can be selected by a simple change of resistors to optimize different modulation performance characteristics, e.g., sensitivity, linearity and third-order intermodulation. Once an operating point has been selected, the modulator system 20 automatically adjusts the error signal to prevent operating point movement that would otherwise occur because of operating conditions. The system is simple and, since only a single active component is required, it requires very little input power.

The modulator 22 includes a pair of coupled optical waveguides 24, 26. In one embodiment, these waveguide are formed by diffusion of titanium into a lithium niobate substrate 28. The waveguide 24 has an input arm 30 and an output arm 31. Similarly, the waveguide 26 has an input arm 32 and an output arm 33. Between these arms, the waveguides are arranged to lie in close proximity over a coupling region L so that the evanescent field of a signal in one of the waveguides couples into the other. Electrodes 38 and 40 are fabricated by metal deposition and respectively positioned over waveguides 24 and 26.

If the waveguides are identical, evanescent wave coupling will cause a light signal in one waveguide to transfer completely to the other waveguide when $L=\pi/2c$ where c is the coupling coefficient. When the waveguides are not identical, the proportion of energy that is transferred is a function of the difference in refractive indices of the two waveguides. Thus, the operating point of the modulator transfer function can be controlled by a bias voltage that is applied across the electrodes 38, 40 to control the waveguides' refractive indices.

Figure 2:
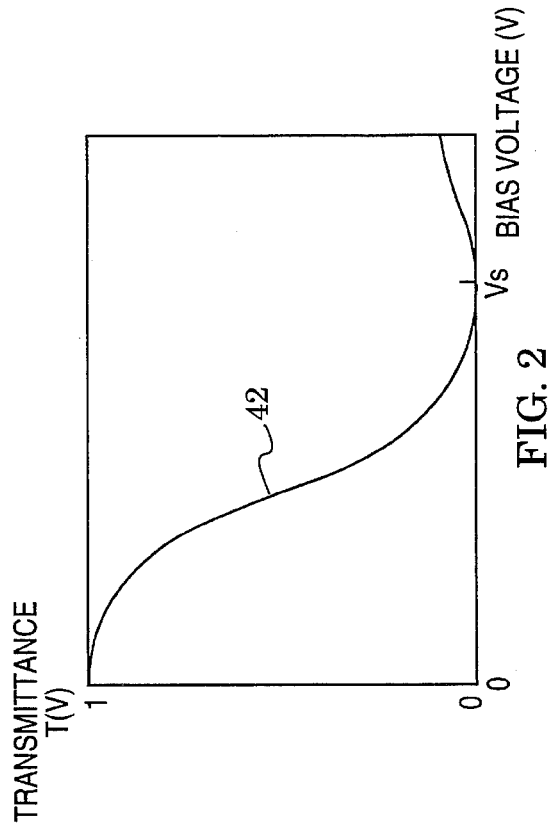
FIG. 2 is a graph of the transmittance transfer function of the directional coupler modulator of FIG. 1.

The transmittance transfer function T(V) for the modulator 22 is the ratio of the output intensity $I_{out}$ in the waveguide arm 33 to the input intensity $I_{in}$ in the other waveguide arm 30. This transfer function is $$T(V) = \frac{I_{out}}{I_{in}} = \frac{\sin^2\left[cL\sqrt{1+3\left(\frac{V}{V_s}\right)^2}\right]}{1+3\left(\frac{V}{V_s}\right)^2}$$

in which V is the bias voltage placed across the electrodes 38, 40 and $V_s$ is a modulator parameter generally known as the "switching voltage". It is the voltage required to switch the modulator 22 from a first operating point, at which no energy is transferred from the waveguide 30 to the waveguide 33, to a second operating point at which all the energy is transferred. A typical transmittance function T(V) is shown as the curve 42 in the graph of FIG. 2. The optical energy transferred to the other output waveguide 31 is the complement of this transfer function.

Figure 3A:
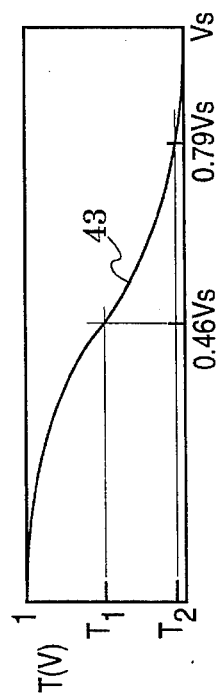
FIG. 3A is a graph of the transfer function of FIG. 2 for bias voltages between zero and the switching voltage Vs.
Figure 3B:
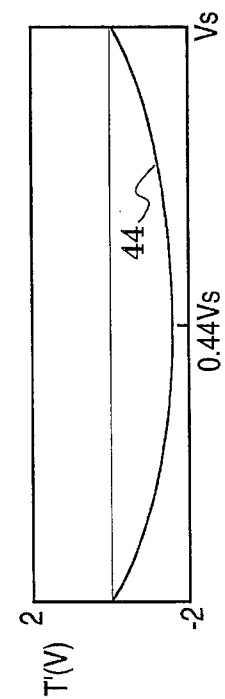
FIGS. 3B–3D are graphs respectively of the first, second and third derivatives of the transfer function of FIG. 3A.
Figure 3C:
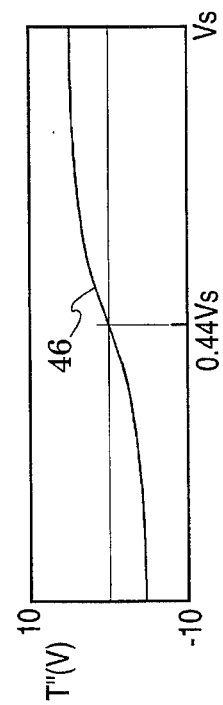
Figure 3D:
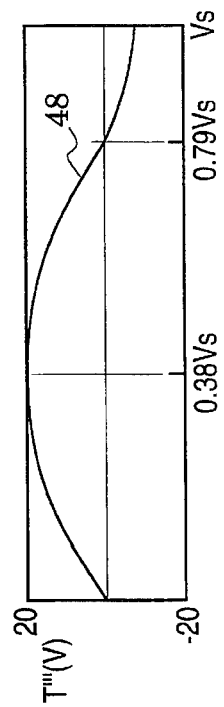

It is informative to examine the modulator transfer function in terms of its derivatives. The function is illustrated, for bias voltages between zero and $V_s$, as the curve 43 in FIG. 3A. FIGS. 3B–3D respectively illustrate the first derivative 44, the second derivative 46 and the third derivative 48 of this transfer function.

It has been shown (J. Schaffner, et al., "High Fidelity Microwave Remoting", *Final Technical Report*, Rome Laboratory, Air Force Material Command, Griffiss Air Force Base, New York, #RL-TR-93-3, March, 1993, pp. 24–32) that the transfer function 43 has a value of $T_1$=0.5 at approximately 0.46 $V_s$, and that the second derivative (which indicates second harmonic magnitude) is zero at approximately 0.44 $V_s$. Therefore, good linearity and sensitivity and a low second harmonic will be obtained with a bias voltage that causes the transfer function to have a value of $T_1$ =½, i.e., the half-power point.

It has also been shown that the third derivative (which indicates third harmonic and third-order intermodulation magnitudes) has a maximum at approximately 0.38 Vs and is zero at approximately 0.79 $V_s$. If third-order intermodulation products are the principal concern, e.g., to maximize dynamic range in a system where the second harmonic is filtered out, then a bias voltage of 0.79 Vs is preferred. As shown in FIG. 3A, this will be obtained when the transfer function has a value of $T_2$.

Returning to FIG. 1, in the operation of modulator 22 a light carrier signal 50, e.g., from a laser, is typically applied to a coupler arm, e.g., the arm 30, and an RF modulating signal 52 is applied across the modulator's electrodes 38, 40. The intensity modulated carrier 54 can be taken from either output arm, e.g., the arm 33.

The control loop stabilization circuit 21 includes photodetectors in the form of a reference photodiode 58 and a feedback photodiode 60. A reference sample of the carrier signal 50 is coupled off ahead of the modulator 22, e.g., with a fused fiber coupler 62, and fed through a transmission line 64, e.g., an optical fiber, to illuminate the photodiode 58. A modulator feedback signal is fed by another transmission line 65 from the unused modulator output arm 31 to illuminate the photodiode 60. Photodiode illumination is indicated by the illumination arrows 66 and 67.

In response to these illumination signals, the photodiode 58 generates a reference photodiode current 68 and the photodiode 60 generates a feedback photodiode current 70. The currents 68 and 70 are inputs to a comparison network 72, which produces an error signal in the form of a current 74. In response to the error current, a loop processor 78 generates a bias voltage 76. The bias voltage 76 is placed across the electrodes 38, 40 as a control loop feedback signal to establish a selected operating point on the transfer function 43 of FIG. 3A.

In general, the loop processor 78 includes an amplifier 80 which can generate an output voltage range that preferably is as great as the switching voltage Vs. In addition, the processor includes a low pass compensation network that shapes the frequency response of the amplifier to obtain desired loop performance parameters, e.g., stability, rejection of second harmonic and response time. In the system embodiment 20, the low pass network is a shunt capacitor, i.e., the processor is an integrator.

The processor converts the error current 74 into a bias voltage which moves the operating point of the modulator 22 in a direction which decreases the error current substantially to zero. At this operating point, the feedback current 92 is substantially equal to the reference current 94.

In particular, the resistor network 72 has two current dividers: a reference divider formed by resistors 86 and 87 with the resistor junction connected to photodiode 58, and a feedback divider formed by resistors 88 and 89 with the resistor junction connected to photodiode 60. These current dividers are joined at a system node 90 to the input of the processor 78. They convert portions of the reference photodiode current 68 and the feedback photodiode current 70 respectively into a reference current 92 and a feedback current 94. The difference at the node 90 between these currents is the error current 74. When the control loop has stabilized, the error current can be considered to be approximately zero because of high loop gain, i.e., the control loop causes the feedback current 92 to substantially equal the reference current 94.

If the grounded resistors 86 and 89 are set equal to a resistor value of R, then the expression $$i_{74} = i_{92} - i_{94} = \frac{R}{R_{88}+R} i_{70} - \frac{R}{R_{87}+R} i_{68}$$

defines the error current 74 (in the expression, the symbol i indicates electrical current to avoid confusion with the use of the symbol I for photonic illumination). Since the currents 70 and 68 have some fixed relationship with the light intensities $I_{out}$ and $I_{in}$, the ratio between the feedback current 70 and the reference current 68 can be written as $$\frac{i_{70}}{i_{68}} = kT(V)$$

where k is a system constant. Substituting this relationship in the previous equation yields $$i_{74} = Ri_{68} \left( \frac{kT(V)}{R_{88}+R} - \frac{1}{R_{87}+R} \right)$$

for the error current 74.

If the gain of the operational amplifier 80 is very high, then its inverting input is essentially at ground. If it is assumed that the operational amplifier 80 also has an infinite input impedance, then the error current 74 can also be expressed as $I_{74} = -C(dV/dt)$ in which C is the capacitor 82 and V is the voltage across this capacitor. Therefore, the bias stabilization system 20 is described by the simple differential equation $$\frac{dV}{dt} = \frac{Ri_{68}}{C} \left( \frac{kT(V)}{R_{88}+R} - \frac{1}{R_{87}+R} \right).$$

When the system control loop is at equilibrium, dV/dt=0 and, therefore, $$T(V_e) = \frac{1}{k} \frac{R_{88}+R}{R_{87}+R}$$

is the transfer operating point set by an equilibrium bias voltage Ve.

If k=1, $R_{88}$=R and $R_{87}$=3R, then T(Ve)=0.5. At this operating point, the light intensity in the coupler arm 33 is one half the intensity in the entrance arm 30, i.e., the modulator is at the operating point $T_1$ (shown in FIG. 3A) for maximum sensitivity and linearity. If k=1, $R_{88}$=2R, and $R_{87}$=3R, then T(Ve)=0.75; this intensity ratio approximates the operating point $T_2$ (shown in FIG. 3A) for minimizing third-order intermodulation products. If k=0.5, $R_{88}$=R and $R_{87}$=R, then again T(Ve)=0.5. The system constant k is determined by parameters such as the coupling value of the coupler 62, transfer function match between the photodiodes 58 and 60 and comparative insertion losses of transmission lines 64 and 66.

Although the control loop 21 description has been based on an error current, it could equivalently be described by reference to an error voltage that is produced by the comparison network 72. In general, the control loop converts an error signal into the required bias voltage to stabilize the modulator 22 at a selected transfer function operating point.

In FIG. 1, the feedback illumination signal 67 is shown to come from the modulator arm 31. However, either output arm can be used as long as the sense around the control loop is arranged to produce negative feedback. The actual bias voltage $V_s$ required to switch the waveguide energy is a function of modulator fabrication parameters. Accordingly, it may be necessary to combine the output 76 of the processor 78 with a DC offset voltage, e.g., $V_s/2$, in a summing network so that the processor 78 output range covers the entire transfer function. In FIG. 1, the RF signal 52 is applied through a coupling capacitor 96. To avoid RF loading of the processor 78, the RF signal may preferably be applied through a microwave bias tee. If desired, the coupler 62 can be integrated into the substrate 28.

Another embodiment of the control loop 21 can be formed by replacing the directional coupler modulator 22 with the Mach-Zehnder modulator 100 shown in FIG. 4A. The Mach-Zehnder modulator typically has a substrate 101 that carries an input arm 102 and an output arm 104. These arms are connected by parallel waveguide paths 106 and 108. Electrodes 110, 112 are formed in association with one of the paths so that its refractive index can be modulated by a modulating voltage. The refractive index of the other path is unmodulated. The modulator 100 can be substituted into the system 20 by adding a directional coupler 114 in association with the output arm 104. Light from the couplers 62 and 114 would then illuminate the photodiodes 58 and 60, respectively.

FIG. 4B illustrates another Mach-Zehnder modulator 116. The modulator 116 is similar to the modulator 100, with like reference numbers indicating like elements. However, the modulator 116 is manufactured with an optical fiber "pigtail" 117 that carries unguided substrate light. This signal is the complement of the signal in the output arm 104. The Mach-Zehnder 116 can replace the directional coupler modulator 22 with the illumination for the photodiode 60 taken from the pigtail fiber 117.

The transmittance function for a Mach-Zehnder modulator is a simple $\cos^2$ function; specifically it is $$T(V) = \frac{I_{out}}{I_{in}} = \cos^2\left(\frac{\pi V}{2V_\pi}\right)$$

in which V is the bias voltage placed across the electrodes 110, 112 and $V\pi$ is the "half-wave voltage". This is the voltage required to cause a phase shift of $\pi$ radians in the Mach-Zehnder modulator. The transmittance function T(V) for the Mach-Zehnder modulator is shown as the curve 118 in the graph of FIG. 5. Setting the resistors of the resistor network 72 of FIG. 1 to obtain a transfer function value of 0.5 will yield the optimum linearity, sensitivity, second harmonic production and third-order intermodulation products for the Mach-Zehnder modulator. This operating point is the inflection point in the curve 118 and it is obtained with a bias voltage of $V\pi/2$.

The unbiased photodiodes 58, 60 of FIG. 1 have a low impedance which changes with the intensity of illumination. If the operational amplifier 80 has an appreciable offset voltage, there may be an insufficient input bias to prevent the amplifier from latching at one end of its linear region. Accordingly, it may be desirable to operate the control loop of the system 20 with reverse biased photodiodes. Reverse biasing a photodiode increases its linearity and its impedance. In addition, the impedance variation is less sensitive to illumination intensity.

Figure 6:
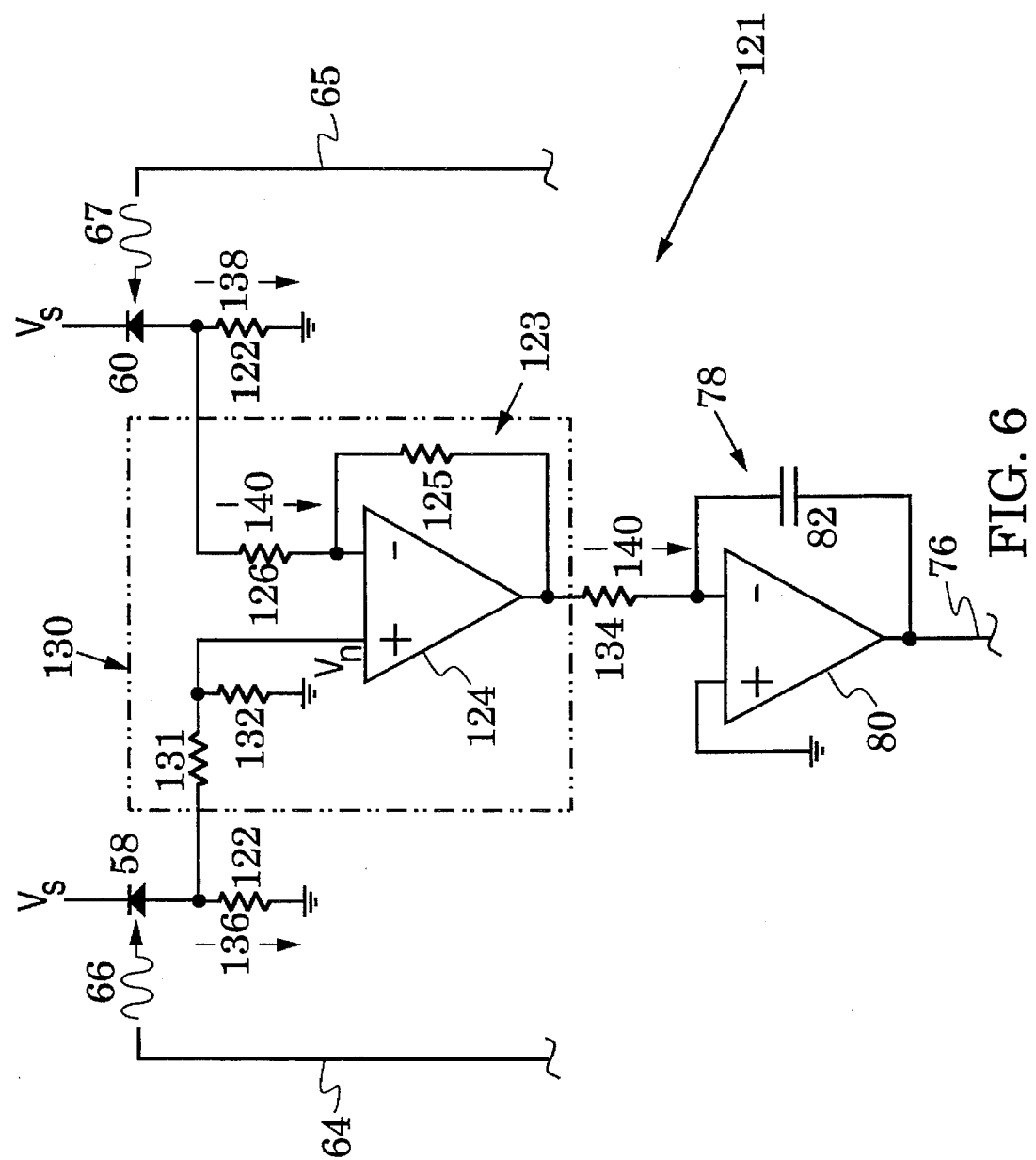
FIG. 6 is a schematic diagram of another feedback loop control embodiment for substitution into the system of FIG. 1.

FIG. 6 illustrates another control loop embodiment 121. The embodiment 121 is similar to the control loop 21 of FIG. 1 with like reference numbers indicating like elements. The loop 121 uses a supply voltage Vs and a series resistor 122 to reverse bias each of the photodetectors 68, 70. The resistive comparison network 72 in FIG. 1 is replaced with a comparison network 130. This network includes a buffer amplifier 123 in the form of an operational amplifier 124 with a feedback resistor 126 and a source resistor 126 of equal value.

A voltage divider in the form of resistors 131, 132 connects the noninverting input of the amplifier 124 with the reference photodiode 58. The source resistor 126 connects the amplifier's inverting input with the feedback photodiode 60. The current for processor 78 is drawn through a source resistor 134. Preferably, the resistor 126 and the sum of the resistors 131 and 132 are chosen to be much larger than the resistors 122.

In operation, illumination of the photodiodes 58 and 60 will cause a reference photodiode current 136 and a feedback photodiode current 138. The voltage Vn at the noninverting input of the operational amplifier 124 is $$V_n = i_{136} R_{122}\left(\frac{R_{132}}{R_{131} + R_{132}}\right).$$

The gain of the operational amplifier 124 causes the potential difference between its inputs to be essentially zero. Therefore, $$i_{140} = \frac{i_{138} R_{122} - \frac{i_{136} R_{122} R_{131}}{R_{131} + R_{132}}}{R_{126}}$$

is an expression for the error current 140 through the source resistor 126 and also through the source resistor 134. Duplicating the analysis described above, gives $$T(V_e) = \frac{1}{k} \frac{R_{131}}{R_{131} + R_{132}}$$

as the transfer operating point when the control loop is at equilibrium. Selected operating points on the modulator transfer function can thus be set by an appropriate selection of the resistance values for voltage divider resistors 131, 132, which select a portion of the photodiode 58 signal. The circuit 121 adds another degree of freedom in that the loop time constant can be independently set with selected values of the resistor 134 and the capacitor 82.

In the feedback circuits 21 and 121 of FIGS. 1 and 6, the photodetector elements for developing reference and feedback current signals can, in general, be any type of photodetector, e.g., a photoconductor or a photodiode. A single power source, e.g., a battery, can be used to bias the photodetectors 58 and 60 and the amplifiers 80 and 124. Because the current drain of these components is very low, a modulator system in accordance with the invention can be operated on battery power alone. The photodetectors need only detect average power; therefore, they may be low-speed germanium detectors. However, the resistors used to develop the error currents and the integrating capacitor 82 are preferably precision types to reduce their sensitivity to temperature changes.

An exemplary modulator system was built with a Mach-Zehnder modulator substituted into the system 20 of FIG. 1 and the system also modified with the feedback circuit 121 of FIG. 6. The bias Vs on the photodetectors 58 and 60 was set at 5 volts. The following circuit values were used: resistor 122=1 kohm, resistors 126, 130 and 132=10 kohm, resistor 134=100 kohm, and C=0.1 microfarad. A single chip, low-power CMOS dual operational amplifier provided the amplifiers 124 and 80. The input of the transmission line 65 was taken through a coupler so that the system constant k was equal to 1. This set the modulator transfer function to the half power point which optimizes the performance of the Mach-Zehnder modulator.

The RF input power was set at −15 dBm. The second harmonic at the output of the Mach-Zehnder modulator was measured to be approximately −97 dBm. A summing network at the output 76 allowed the introduction of a step voltage so that the loop response time could be measured. A step of 100 millivolts was corrected within 2 seconds. The photodetector current 138 in FIG. 6 was measured as an indication of operating point stability. In an overnight test, the current 138 changed less than 0.5%.

While several illustrative embodiments of the invention have been shown and described, numerous variations and alternate embodiments will occur to those skilled in the art.

Such variations and alternate embodiments are contemplated, and can be made without departing from the spirit and scope of the invention as defined in the appended claims.

We claim:

1. A control loop for stabilizing the operation of a light intensity modulator that is configured to deliver an intensity modulated light signal at an output port in response to a carrier light signal at a first input port and a modulating voltage signal at a second input port, the network comprising;

a reference photodetector arranged to produce a reference signal in response to the intensity of said carrier signal;

a feedback photodetector arranged to produce a feedback signal in response to the intensity of said modulated signal;

a comparison network configured to produce an error signal in response to said reference signal and said feedback signal; and a loop processor configured to generate a bias signal at said second input port in response to said error signal.

2. The control loop of claim 1, wherein said loop processor includes;

an amplifier; and a low pass compensation circuit arranged to shape the frequency response of said amplifier.

3. The control loop of claim 1, wherein said comparison network includes a resistive divider configured to select a portion of one of said reference signal and said feedback signal to obtain a selected intensity ratio of said modulated signal to said carrier signal.

4. The control loop of claim 1, wherein said light intensity modulator comprises a directional coupler intensity modulator.

5. The control loop of claim 1, wherein said light intensity modulator comprises a Mach-Zehnder intensity modulator.

6. The control loop of claim 1, wherein said first and second photodetectors each comprise a photodiode.

7. The control loop of claim 1, wherein said first and second photodetectors each comprise a photoconductor.

8. A stabilized photonic modulator system, comprising:

a light intensity modulator having first and second input ports and an output port, said modulator configured to deliver an intensity modulated light signal at said output port in response to a carrier light signal at said first input port and a modulating voltage signal at said second input port;

a reference photodetector arranged to produce a reference signal in response to the intensity of said carrier signal;

a feedback photodetector arranged to produce a feedback signal in response to the intensity of said modulated signal;

a comparison network configured to produce an error signal in response to said reference signal and said feedback signal; and a loop processor configured to generate a bias signal at said second input port in response to said error signal.

9. The system of claim 8, wherein said loop processor includes;

an amplifier; and a low pass compensation circuit arranged to shape the frequency response of said amplifier.

10. The system of claim 8, wherein said comparison network includes a resistive divider configured to select a portion of one of said reference signal and said feedback signal to obtain a selected intensity ratio of said modulated signal to said carrier signal.

11. The system of claim 8, wherein said light intensity modulator comprises a directional coupler intensity modulator.

12. The system of claim 8, wherein said light intensity modulator comprises a Mach-Zehnder intensity modulator.

13. The system of claim 8, wherein said first and second photodetectors each comprise a photodiode.

14. The system of claim 8, wherein said first and second photodetectors each comprise a photoconductor.

15. A method of stabilizing the operation of a photonic modulator which is configured to produce an intensity modulated light signal in response to a carrier light signal and a modulating voltage signal, the method comprising the steps of:

developing an initial reference signal that indicates the intensity of said carrier signal;

developing an initial feedback signal that indicates the intensity of said modulated signal;

comparing said initial reference signal and said initial feedback signal to produce an error signal;

processing said error signal to produce a bias voltage signal; and modulating said carrier signal with said bias voltage signal.

16. The method of claim 15, wherein:

said initial reference signal developing step includes the step of illuminating a reference photodetector with a sample of said carrier signal; and said initial feedback signal developing step includes the step of illuminating a feedback photodetector with a sample of said modulated signal.

17. The method of claim 15, wherein said processing step includes the steps of:

amplifying said error signal; and shaping the frequency response of said amplifying step.

18. The method of claim 15, wherein said comparing step includes the steps of:

modifying said initial reference signal to form a final reference signal;

modifying said initial feedback signal to form a final feedback signal; and forming said error signal from the difference between said final feedback signal and said final reference signal.

19. The method of claim 18, further comprising the steps of;

selecting an operating point on an intensity transfer function of said modulator;

determining an intensity ratio of said modulated signal to said carrier signal that is in accordance with said selected operating point; and wherein said comparing step further includes the steps of adjusting said modifying steps as required to obtain said intensity ratio when said error signal is substantially zero.

* * * * *